(No Model.)

A. D. CARLE.
SASH BALANCE.

No. 477,099. Patented June 14, 1892.

Witnesses
B. S. Ober
N. J. Riley

Inventor
Amos D. Carle,
By his Attorneys,
C. A. Snow & Co.

THE NORRIS PETERS CO., PHOTO-LITHO., WASHINGTON, D. C.

UNITED STATES PATENT OFFICE.

AMOS D. CARLE, OF MALDEN, MASSACHUSETTS.

SASH-BALANCE.

SPECIFICATION forming part of Letters Patent No. 477,099, dated June 14, 1892.

Application filed August 14, 1891. Serial No. 402,637. (No model.)

*To all whom it may concern:*

Be it known that I, AMOS D. CARLE, a citizen of the United States, residing at Malden, in the county of Middlesex and State of Massachusetts, have invented a new and useful Window-Pulley, of which the following is a specification.

The invention relates to improvements in sash-balances.

The object of the present invention is to simplify and improve the construction of sash-balances, to dispense with weights, and to adjust the balances readily to any weight of window.

The invention consists in the construction and novel combination and arrangement of parts hereinafter fully described, illustrated in the accompanying drawings, and pointed out in the claim hereto appended.

Figure 1:
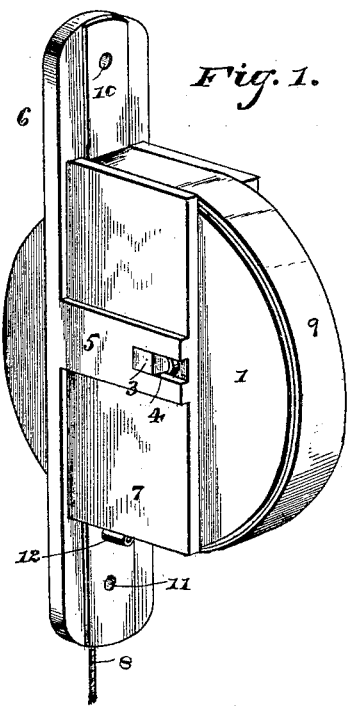
Figure 2:
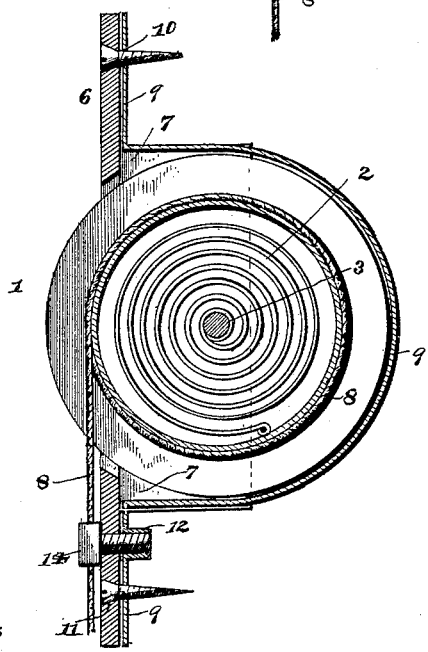
Figure 3:
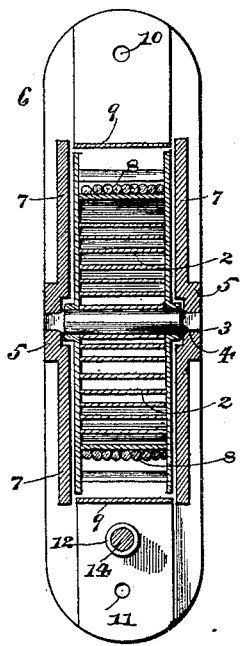

In the drawings, Figure 1 is a perspective view of a sash-balance constructed in accordance with this invention. Fig. 2 is a longitudinal sectional view. Fig. 3 is a transverse sectional view.

Referring to the accompanying drawings, 1 designates a spring-actuated pulley, in which is arranged a coiled spring 2, which has one end secured to the pulley and the other end attached to a trunnion or spindle 3, having its ends square and arranged in recesses 4 of a casing 5. The casing 5 consists of a face-plate 6, which is secured to a window-frame, and sides 7, which are formed integral with the face-plate 6. The pulley turns on the spindle or trunnion 3, and the casing is secured to a window-frame similar to the ordinary pulley, and a sash cord or chain 8 is wound round the pulley in a direction opposite to the arrangement of the spring, whereby when the sash-cord is pulled upon it will be in opposition to the spring, which will return the cord in a window to a normal position.

The pulley is adjusted for windows of different weights by a friction device, which consists of a band 9 of sheet metal approximately semicircular and having one end 10 secured to one end of the face-plate 6, and the other end 11 of the band is provided with a lug 12, having a threaded opening which is engaged by an adjusting-screw 14, adapted to draw the band into engagement with the inner side of the pulley to create friction and to retard the rotation of the pulley. The band extends around the inner side of the pulley and creates sufficient friction to adapt the device to the heaviest windows.

The balance is adapted to be readily secured to a window-casing in a manner similar to the ordinary window-pulleys, the ends of the face-plate being extended beyond the ends of the sides 7 and perforated to receive screws for securing the balance. It is simple, strong, and durable, and it may be quickly adjusted to suit windows of any weight.

What I claim is—

In a sash-balance, the combination of a casing, a spring-actuated pulley mounted therein and adapted to receive a sash cord or chain, a brake-band arranged to engage the pulley frictionally to retard the rotation of the same and having one end secured to the casing by a screw for securing its casing to a window-frame and provided at its other end with a lug having a threaded opening, and an adjusting-screw mounted in the casing and engaging the threaded lug and provided with a polygonal head arranged on the outer face of the casing, whereby the pressure on the pulley may be positively adjusted from the exterior of the window-casing, substantially as described.

In testimony that I claim the foregoing as my own I have hereto affixed my signature in presence of two witnesses.

AMOS D. CARLE.

Witnesses:
FRANK J. WILLARD,
HARRY H. BARRETT.